Dec. 12, 1950  H. W. HAMLETT  2,533,793
ROTARY PLOW AND SCREEN
Filed July 10, 1947  5 Sheets-Sheet 1

Inventor
Harry W. Hamlett
By
Atty.

Dec. 12, 1950 H. W. HAMLETT 2,533,793
ROTARY PLOW AND SCREEN
Filed July 10, 1947 5 Sheets-Sheet 2

Dec. 12, 1950     H. W. HAMLETT     2,533,793
ROTARY PLOW AND SCREEN
Filed July 10, 1947     5 Sheets-Sheet 3

Inventor
Harry W. Hamlett

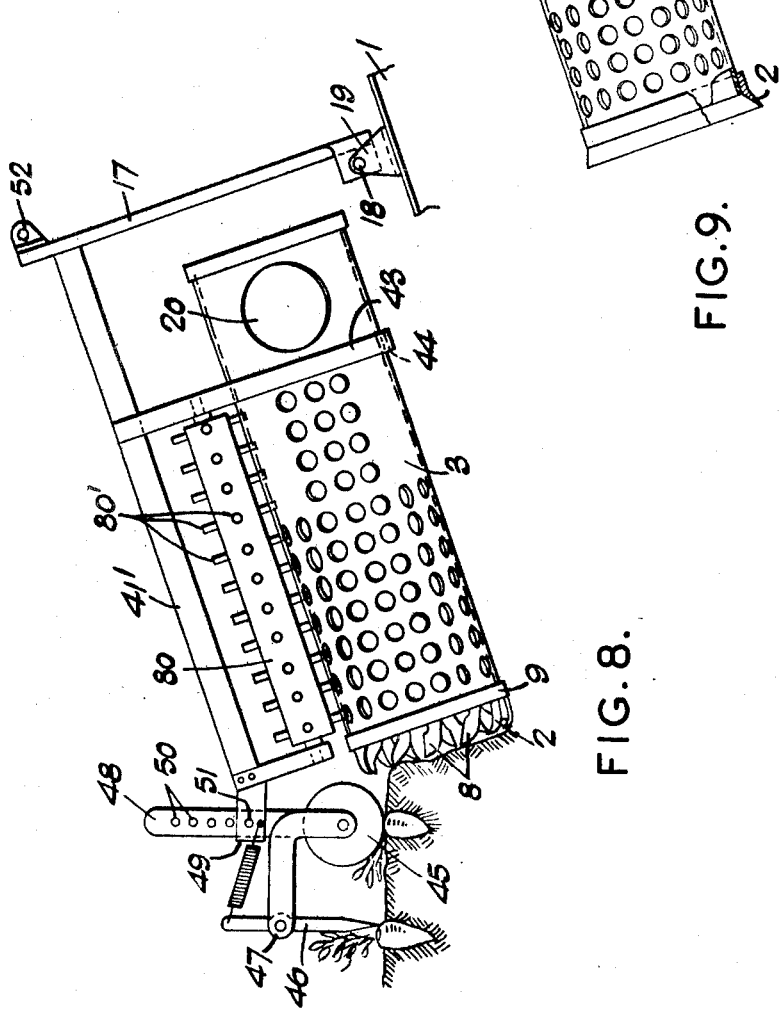

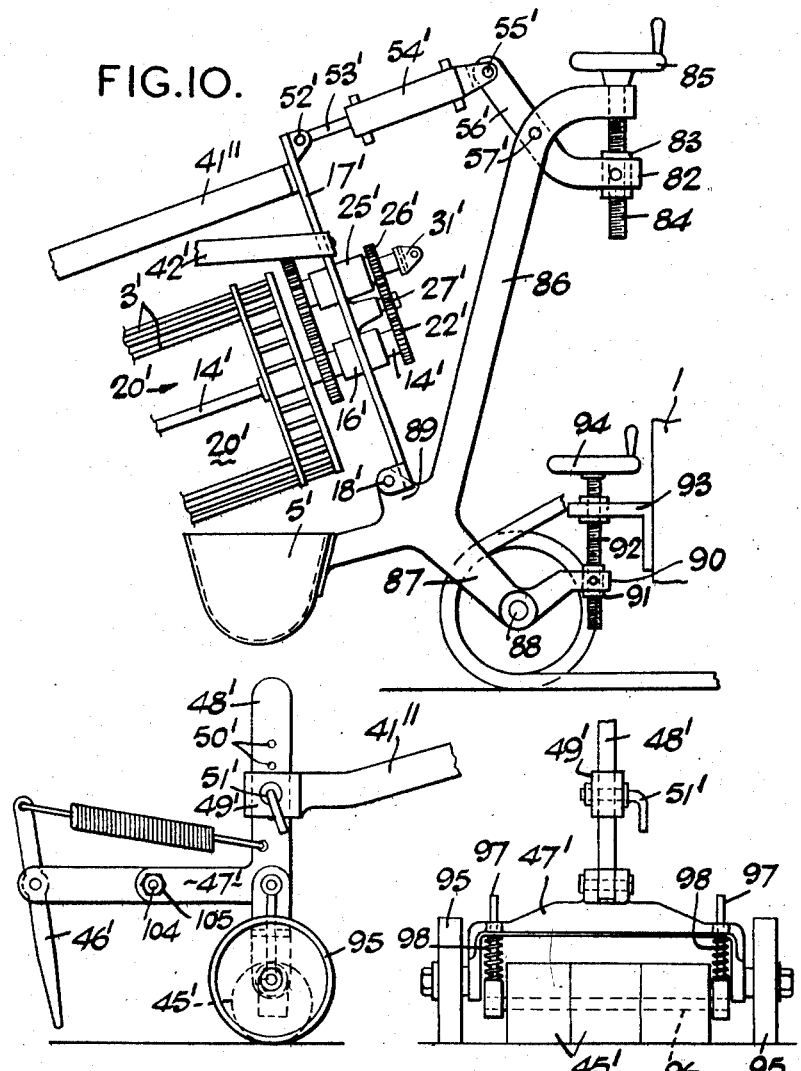
FIG.10.
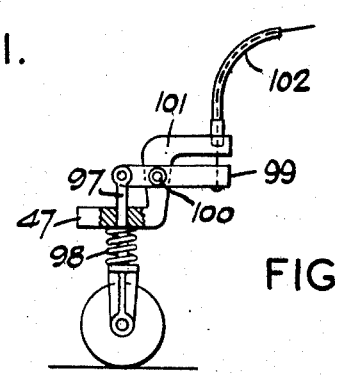
FIG.11.
FIG.12.
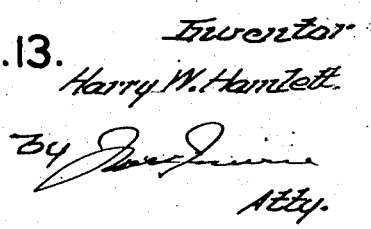
FIG.13.

Patented Dec. 12, 1950

2,533,793

UNITED STATES PATENT OFFICE 2,533,793

ROTARY PLOW AND SCREEN

Harry Williams Hamlett, London, England

Application July 10, 1947, Serial No. 760,179
In Great Britain July 10, 1946

2 Claims. (Cl. 55—57)

The invention relates to excavating machines for use in agriculture, surface mining, ditching or other like land working operations.

While a machine according to the invention is capable of being adapted to any of the above purposes it is particularly adaptable to the harvesting of root crops, for instance sugar beet, potatoes or turnips.

It may be combined or provided with means for cultivating the soil simultaneously with excavation or harvesting.

An excavating machine according to the invention comprises a tractor—which term includes any suitable type of motor propelled vehicle for supporting and propelling the machine—provided in front with one or more power driven rotary excavating tools, adapted to be set at an inclination to the ground and thrust forward by the tractor, each excavating tool consisting of a tube which is fitted at its front end with a cutter and is provided internally with a worm conveyor.

While in a simple form the cutter may be in the form of a sharp circular edge, it is an advantage, especially when the excavator is used for harvesting root crops, that the cutter be in the form of a number of inwardly directed knives, each preferably having a convex helical or otherwise curved cutting or leading edge, adapted to draw, cut or slice the soil which is directed by the knives inwards to form a core compressed about the roots to be harvested, facilitating their extraction and their passage into the conveyor tube.

The conveyor tube may be perforated, formed with spaced rods or formed of expanded metal so as to act as a riddle or screen, the unwanted soil being thrown by centrifugal action against the edges to the conveyor and screen broken up and discharged through the screen while the cleaned retained materials or roots are conveyed up the tube and delivered into a hopper and may be delivered therefrom preferably by an elevator at one or both sides of the machine, for example into graders or receptacles on the tractor or into a wagon following the machine.

Means are provided yieldingly to hold the tools to their work, so that they can rise on meeting an undue obstruction, such means being preferably adapted to lower and to raise the tools at the beginning and end of a bout. Other means are preferably provided for lowering and raising them collectively to facilitate transport of the machine from field to field or along a road.

Each tool is preferably provided with a depth regulating roller and in the case of a harvester for root crops such as sugar beet, a rake is provided in front of each depth roller to brush down the leaves of the root so that the depth roller holds the leaves while cutter knives cut them. At the same time undesirable tail root can be removed by the knives.

The cutter knives can thus top and tail roots such as beet before raising them from the ground.

Means may be provided to raise or lower rear end of conveyor tube to alter angle of attack, maintain top of cutter at requisite height from ground and vary vertical depth of cut core without altering position of depth setting roller.

In the accompanying drawings which illustrate one example of machine according to the invention, particularly for use in harvesting root crops—

Figure 4 is a somewhat diagrammatic illustration of a hydraulic cylinder and its connections.

Figure 8 is a side view of an alternative form of screen.

Figure 9 is a side view partly in section, showing an alternative form of cutter.

Figure 10 is a side view showing an alternative form of mounting for the excavating tool.

Figures 11 and 12 are, respectively, a side view and a rear view illustrating an alternative arrangement of depth roller and rake.

Figure 13 is a side view illustrating means for operating an hydraulic cylinder valve by means of the depth roller.

Figure 1:
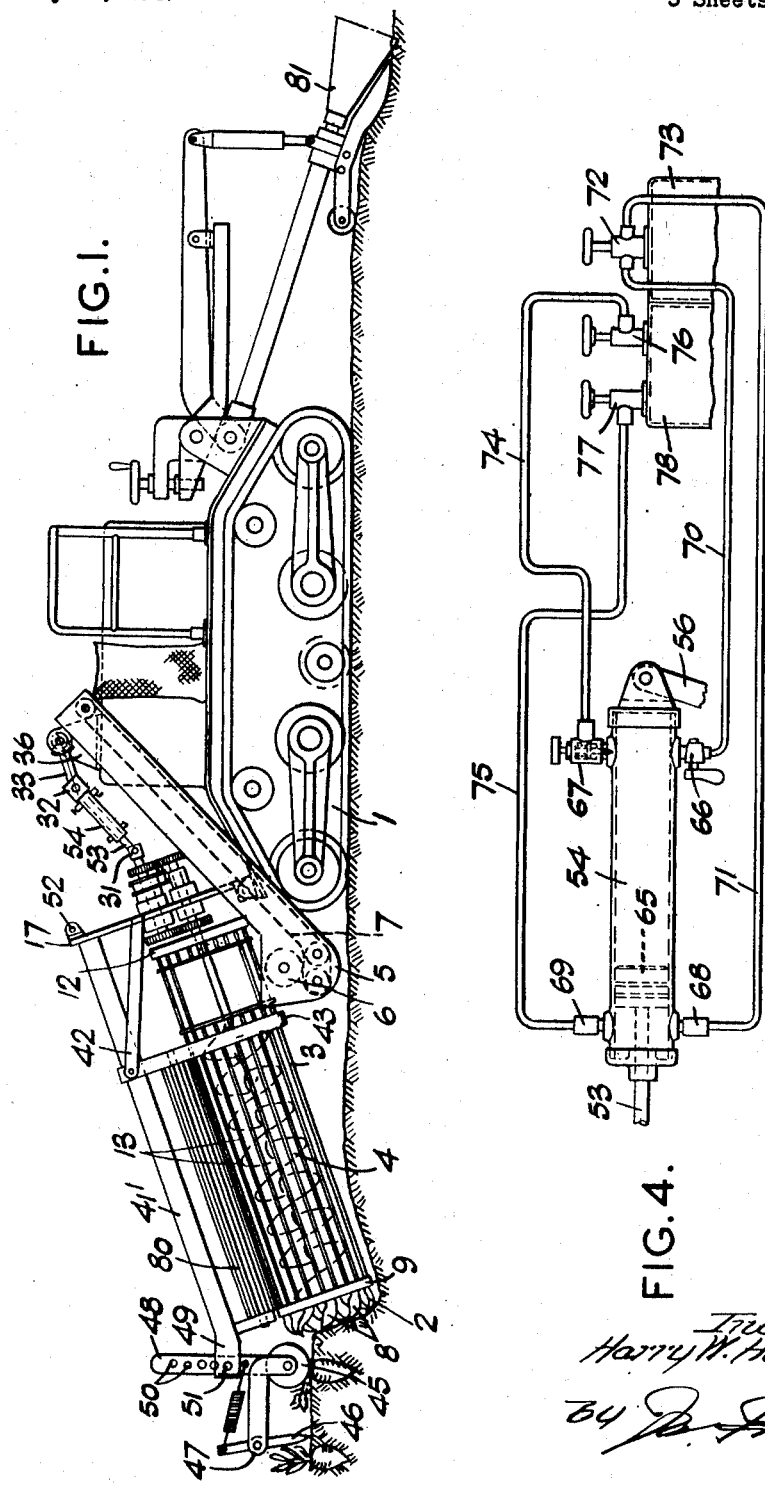
Figure 1 is a side view of the machine, the rear part of the tractor being indicated somewhat diagrammatically.
Figure 2:
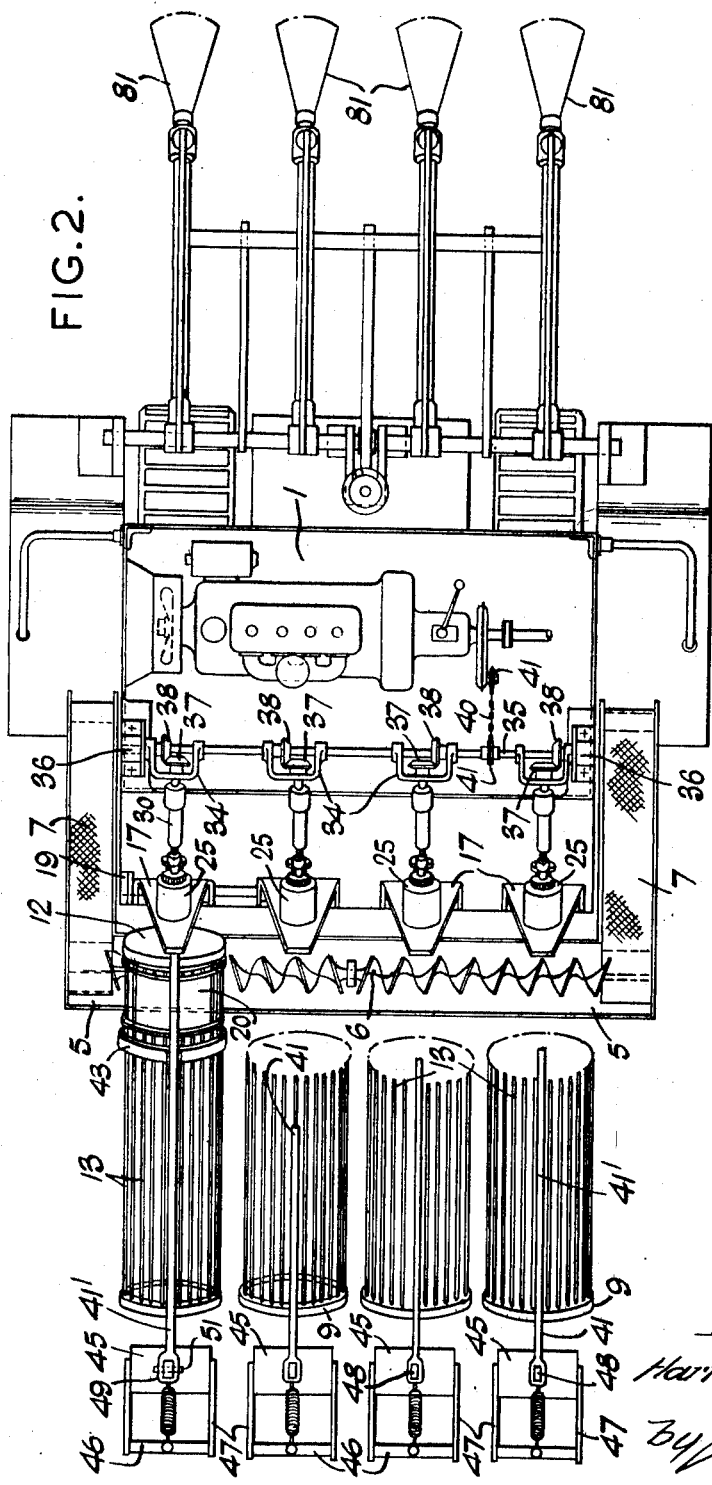
Figure 2 is a plan of the machine, parts being omitted for the sake of clearness.

In the example of machine intended for harvesting root crops as illustrated in Figures 1 and 2 a tractor 1 of the endless track type is fitted in front with a number of excavating tools or units each of which comprises a cutter 2, a rotary conveyor tube 3, fitted with a worm conveyor 4, the conveyor tube 3 being adapted to act as a revolving sieve or screen, and delivering the harvested roots into a hopper or trough 5 fitted with worm conveyors 6, 6, and from which the roots are raised by elevators 7, 7, for delivery.

Figures 5, 6:
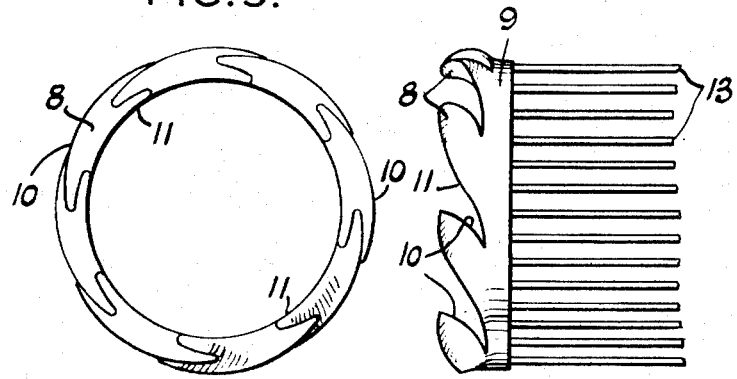
Figures 5 and 6 are respectively a front and a side view of a cutter consisting of a set of knives.

The cutter 2 in this example consists of a number of knives 8 carried by a ring 9 each knife having a convex curved leading edge and a straight concave trailing edge. In Figure 1 the knives 8 are shown well spaced apart, but as shown in Figures 5 and 6, they may overlap. In these figures the curvature of the leading and trailing edges 10 and 11 of the knives is shown more clearly and the manner in which the knives 8 are directed inwards, the roots or connections of the leading edges 10 to the ring 9 being on a circle or larger diameter than those of the trailing edges 11. This arrangement is adopted to ensure that the soil cut by the knives 8 is thrust inwards for a purpose hereinafter explained.

Figure 3:
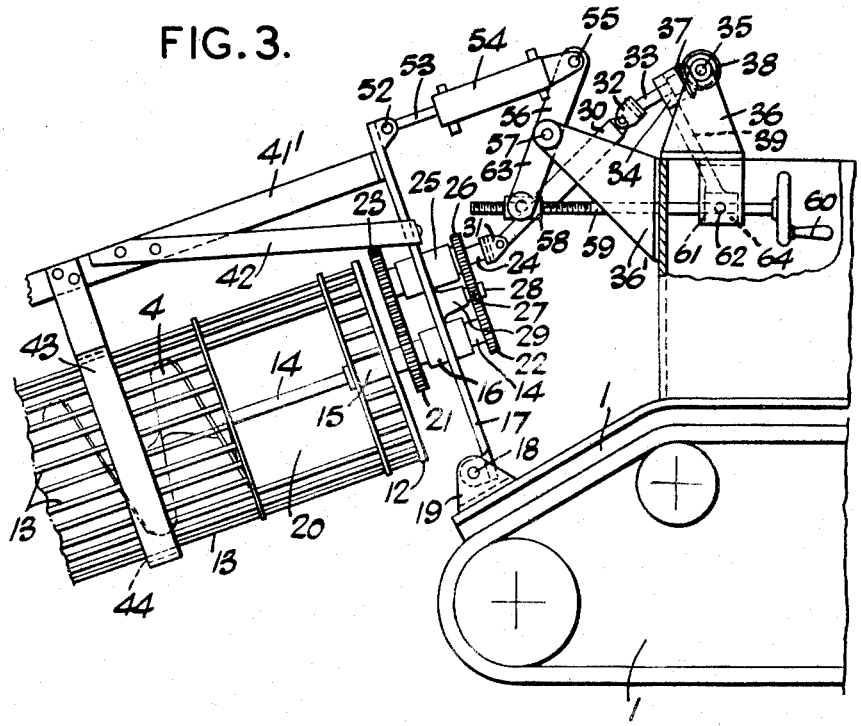
Figure 3 is a side view illustrating gearing for one of the excavating or harvesting units.

The ring 9 on the fore end of the conveyor tube 3 is connected to a circular plate 12, Figures 1 and 3, at the rear end by rods 13 so that the tube forms a riddle or screen. A delivery opening 20 or gap in the rods is provided at the rear end.

The shaft 14 of the worm conveyor 4 passes through a sleeve 15 on the plate 12 and also through a bearing 16 on a bracket 17 which is free to oscillate on a shaft 18. The shaft 18 is carried by brackets 19 on the tractor 1.

Figure 7:
Figure 7 is a side view of part of a conveyor.

The conveyor shaft 14 is preferably welded or otherwise secured to the worm conveyor 4, so that there is thus no obstruction in the centre 24, Figure 7, between the conveyor blades as would occur if the shaft 14 extended straight through the centre of the tube 3.

The sleeve 15 is fitted with a gear wheel 21 and the shaft 14 with a gear wheel 22. The wheel 21 meshes with a gear wheel 23 on a shaft 24 which is carried in a bearing 25 on the bracket 17 and is also fitted with a gear wheel 26 meshing with an intermediate gear wheel 27 which meshes with the wheel 22. The wheel 27 rotates on a stud 28 carried by an arm 29.

The shaft 24 is connected by a universal coupling 31 to a telescopic shaft 30. The shaft 30 consists of an inner part capable of sliding in an outer part but compelled to rotate with it, either by a feather or key or by co-operating splines on the two parts. The outer part of the telescopic shaft 30 is connected by a universal coupling 32, to a short shaft 33 carried by a yoke 34 pivotally mounted on a driving shaft 35 extending across and supported on the tractor 1 by bearing brackets 36. The shaft 33 has a bevel pinion 37 meshing with a bevel wheel 38 on the driving shaft 35. As indicated in Figure 3, one of the yokes 24 adjacent to a bracket 36 is connected by a stay 39 to a cross-bar or rod 62 referred to later on.

The driving shaft 35 is driven from the tractor in any suitable manner for instance by a chain 40 and sprockets 41.

By these means the conveyor tube 3 and cutter 2 are rotated in one direction and the worm conveyor 4 in the opposite direction.

A bar 41' is firmly secured at its rear end to the bracket 17 being also connected thereto by stays 42. It has a bearing ring 43 embracing the conveyor tube 3 and engaging with a bearing ring 44 on the tube 3. An adjustable roller bearing may be provided between the two rings.

The bar 41' is fitted at its fore end with a depth or adjusting land roller 45 and with a rake 46. When the machine is used for harvesting potatoes or other root crops in ridges, the roller 45 may be shaped to conform to a ridge.

The rake 46 is pivotally mounted in a frame 47 in which the roller 45 is also freely mounted.

The frame 47 is adjustably mounted. It has an upwardly extending arm 48 passing through a socket 49 on the bar 41, the arm 48 being provided with a number of holes 50 for selective insertion of a locking pin 51 providing means for adjusting the position of the roller 45 in relation to the cutter 2 and consequently the depth to which the cutter can be set.

The depth or land roller or rollers 45 also serves to hold down the leaves of the beet or other root crop previously brushed forward by the rake 46 for the purpose hereinafter explained.

The bar 41' also supports a freely mounted cleaning roller 80 composed of rods meshing with the rods of the tube 3.

The bracket 17 is pivotally connected at 52, Figure 3, to the piston rod 53 of a hydraulic cylinder 54 the rear end of which is pivotally connected to a rod 55 extending across the machine and carried by levers 56 fixed on a cross shaft 57. The cross shaft 57 is supported by the frames or brackets 36' on the tractor 1. A lever 63 on the shaft 57 carries a nut 58 engaging with a screw threaded adjusting shaft 59 having a handle 60. The plain end of the shaft 59 is supported in a bearing 61 pivotally mounted on a forked arm 64 on a rod or cross bar 62 which is supported by the brackets 36.

Operation of the screw 59 by the handle 60 through the medium of the nut 58, lever 63 and the shaft 57, the lever 56 and hydraulic cylinder 54 oscillates the bracket 17 so that the conveyor tube 3 with its cutter 2 is lowered and raised to and from the working position. One function of the hydraulic cylinder 54 is to keep the cutter to its work and to act as a dash pot to allow it to rise in the event of its striking an obstruction.

Another function is to raise the tube 3 and cutter 2 when the machine arrives at a headland and to lower them again when commencing another bout.

This function is distinct from that effected by the handle 60 and screw 59 which is used to raise the tube 3 well above the ground during transport from field to field or along a road, and for lowering it sufficiently again when the machine is about to be used.

The piston rod, 53, of the hydraulic cylinder 54 as shown in Figure 4 is fitted with a piston 65.

The cylinder is fitted at the rear end with an inlet valve 66 and an automatic relief outlet valve 67, and at its fore end with an inlet check valve 68 and an outlet check valve 69. The inlet valves 66 and 68 are connected by pipes 70, 71, respectively to a multiported valve 72 so that either can be connected to or cut off from a tank 73, containing oil or other fluid under pressure.

The valves 67 and 69 are connected respectively by pipes 74 and 75 and valves 76 and 77 to a sump or return tank 78.

The oil in the tank 78 is returned to the supply or pressure tank 73 by any suitable pump on the tractor driven from the tractor motor or otherwise.

Assuming that the conveyor tube 3 is in the raised position and is to be lowered into operation, the piston 65 will be at the rear end of the cylinder 54. The inlet valve 66 is then opened and the valve 72 is manipulated to open the pipe 70 to receive pressure oil from the tank 73, and to cut off the supply to the pipe 71. The piston 65 will be thrust forward and by the piston rod 53 allow the bracket 17 to swing forward about the shaft 18 until the roller 45 engages with the land.

During this operation the oil in the cylinder in front of the piston 65 escapes through the check valve 69 and pipe 75 and open valve 77 to the sump or tank 78.

During operation of the machine the hydraulic cylinder 54 acts as a buffer or dash pot to hold the cutter 2 to its work. Should the cutter meet an undue obstruction the tube 3 will be allowed to rise as the automatic release valve 67 will open. The valves 66 and 72 can be adjusted so that the pressure supply is only sufficient to enable the piston 65 to hold the tube 3 steady during operation. When the tube 3 is to be raised for instance at the end of a bout to allow the machine to turn on a headland, the valve 72 is manipulated to close off the pipe 70 and open the pipe 71 and therefore the check valve 68 to a supply of oil under pressure. The valve 77 is closed. Consequently the pressure on the forward side of the piston 65 thrusts the piston to the rear withdrawing the piston rod 53 and raising the tube 3.

A machine may be provided with one tool, i. e. one tube 3 and cutter 2 only or any desired number, there being four indicated in the plan, Figure 2.

Each tool is similar to that above described the driving shaft 35, shaft 18, rod 62 and shaft 57 being common to them all.

Each has a lever 56 on the shaft 57 so that a single lever 63, screw 59 and handle 60 may suffice for them all, but a power driven screw 59 or a hydraulic cylinder may be used if the combined weight of the tools requires it.

In operation the knives 8 of each cutter 2 slice the soil and direct it inwards. When harvesting a root crop such as sugar beet, as the tools are fed forward by the travel of the tractor each rake 46 first brushes the leaves of the beet forward. They are held down by the roller or rollers 45 and then the knives cut off the tops and tail of the beet. The cut soil is forced inwards around the beet and tends to squeeze it as it were in a core of soil so that it passes with the core into the conveyor tube 3.

Herein the core of soil is thrown by gravity and centrifugal action against the inner sides of the conveyor tube, being broken up by the faces of the revolving blades of the worm conveyor, facilitating its lateral ejection from the tube. The cleaned beet is conveyed by the worm conveyor 4 and delivered from the tube 3 through the opening 20 into the trough or hopper 5.

From this it is conveyed by the worm conveyors 6 to the elevators 7 and delivered by them to receptacles either on the tractor or on wagons following alongside. The shaft for the worm conveyor and for the elevators is fitted with a sprocket driven by a chain from a sprocket on the tractor. These parts are omitted from the drawings for the sake of clearness.

The speed of travel of the tractor is adjusted to suit the speed of the rotation of the cutter and conveyor so as to ensure a correct rate of cut. If desired means such as variable speed gearing may be provided on the tractor for varying the speed of rotation of the driving shaft 35 and consequently of the cutter, or alternatively the speed of rotation of the conveyor.

When intended for harvesting a root crop such as potatoes the conveyor tube 3 may be a perforated tube of sheet metal as indicated in Figure 8. A roller 80 is provided with pins 80' for engaging within the holes in the tube 3 to clear them of mud or other material. When several rollers 45 are used, if an abnormally tall beet is encountered the higher and foremost roller first rides over it and is followed by the others behind it, this avoids a sudden jolt likely to raise the cutter.

The tractor 1 may be fitted at the rear with cultivating tools 81, Figures 1 and 2.

While the machine according to the invention is particularly intended for excavating earth in the harvesting of root crops, it can be adapted for excavating earth for other purposes for instance in surface mining, making ditches or channels.

In such cases the cutter knives may be modified in shape or even omitted, the fore edge of the conveyor tube 3 being merely bevelled or sharpened to form a cutter 2 as indicated in Figure 9.

The conveyors 4 rotate in the opposite direction to the conveyor tubes 3. As the cutter knives set up a side thrust it may be desirable, when a number are employed, to arrange that the conveyor tubes 3 and the conveyors 4 of the units or tools, on one side of the centre line of the machine, rotate in the opposite direction to those of the tools on the other side, in order to balance the side thrust, it being understood that the cutter knives and worm conveyors are adapted to suit their directions of rotation in each case.

In all cases, whether for harvesting or excavating only, it is preferred to make the cutter of each tool of sufficient diameter that it undercuts the core of earth, that is it leaves ample clearance for the conveyor tube to follow into the excavation formed by the cutter.

While a tractor of the endless track type is shown in the example above described any other suitable type of tractor or motor propelled vehicle can be used to support the harvesting tool or tools, or it or they may be supported on a wheeled frame adapted to be propelled forward by a tractor. A separate motor may be provided to drive the tools, or the propelling motor may be utilized for this purpose.

Instead of the pivot shaft 18 for the bracket 17 of the excavating tool being directly mounted on the tractor it may be mounted on a frame which is pivotally mounted on the tractor, for instance, as illustrated by Figure 10. In Figures 10, 11 and 12, which will now be referred to, parts which correspond with parts shown in Figures 1 to 8 are indicated by similar reference numerals with the addition of exponents.

By adjusting the frame about its pivot it is possible to alter the angle of attack of the excavating tool, maintain the cutter at the required height from the ground and vary the vertical depth of cut core without altering the position of the depth setting roller.

The frame 86 has an arm 89 in which the shaft 18' is pivotally mounted and the frame 86 has an arm 87 which is pivotally mounted at 88 on the tractor 1'. The arm 87 has an extension 90 carrying a swivelled nut 91 engaged by a screw 92 mounted in a fixed bracket 93 on the tractor and provided with a hand wheel 94. The lever 56' which carries the hydraulic cylinder 54' is pivoted at 57' on the frame 86 and carries a nut 83 for an adjusting screw 84 provided with a hand wheel 85. By means of the handwheel 85 the bracket 17' and consequently the excavating tube 3' can be swung about the shaft 18' as in the example first described. By means of the hand wheel 94 the frame 86 can be swung about the pivot 88.

Consequently, it is possible to adjust the tool by means of the handwheel 94 so that the tube 3' is presented at the best inclination to suit the work to be done, subsequent raising and lowering of the tool being effected by the handwheel 85 or by the hydraulic cylinder 54' as in the examples previously described.

The frame 47' of the depth roller 45' may be provided with land wheels 95 as shown in Figures 11 and 12. The axle 96 of the roller 45 may have rods 97 sliding in holes in the frame and encircled by springs 98. The upward and downward movements of the roller 45' against and under the action of the springs 98 may be utilised to actuate the appropriate valve on the hydraulic cylinder 54' to cause this cylinder to raise and lower the tool when the roller 45' encounters protruding or low lying roots, such as sugar beet, to ensure that the cutter will sever the tops of the roots. For instance is indicated in Figure 13 one of the rods 97 may be connected to a lever 99 pivoted at 100 on a bracket 101 on the frame 47 the lever being connected to a Bowden wire 102 connected to the valve on the hydraulic cylinder 54.

The rake 46' may be carried by arms 103, Figure 11, bolted at 104 on the frame 47' so that it can be adjusted to any desired angle by nuts 105.

I claim:

1. An excavating machine comprising a motor propelled vehicle, a frame pivotally mounted on the front of said vehicle, an excavating tool carried by said frame, said tool comprising a cylindrical screen having cutting elements on its lower forward end and a worm conveyor within the screen, a driving shaft on the vehicle, gearing carried by the frame for rotating said screen and worm and a driving connection between said driving shaft and said gearing, said driving connection including pivotal joints and a telescopic coupling for completing a drive when the frame is moved about its pivotal mounting into various positions, and means operatively connected with the frame for moving said frame about its pivotal mounting for varying the angle of attack of the tool, comprising a shaft, a lever operatively connected with the frame, a nut carried by said lever and an operating screw threaded shaft engaging with said nut, said operative connection between the lever and the frame including a hydraulic cylinder for keeping the tool to its working and for raising and lowering the tool independently of said screw threaded shaft.

2. An excavating machine comprising a motor propelled vehicle, a frame pivotally mounted on the front of said vehicle, an excavating tool carried by said frame, said tool comprising a cylindrical screen having cutting elements on its lower forward end and a worm conveyor within the screen, a driving shaft on the vehicle, gearing carried by the frame for rotating said screen and worm and a driving connection between said driving shaft and said gearing, said driving connection including pivotal joints and a telescopic coupling for completing a drive when the frame is moved about its pivotal mounting into various positions, and means operatively connected with the frame for moving said frame about its pivotal mounting for varying the angle of attack of the tool, comprising a shaft, a lever operatively connected with the frame, a nut carried by said lever and an operating screw threaded shaft engaging with said nut, said operative connection between the lever and the frame including a hydraulic cylinder for keeping the tool to its working and for raising and lowering the tool independently of said screw threaded shaft, said excavating tool including a perforated cylindrical screen having a pin roller co-operating therewith for cleaning said screen.

HARRY WILLIAMS HAMLETT.

REFERENCES CITED

The following references are of record in the file of this patent:

UNITED STATES PATENTS

| Number | Name | Date |
|---|---|---|
| 506,069 | Perry | Oct. 3, 1893 |
| 630,177 | Buchanan | Aug. 1, 1899 |
| 1,701,678 | Jaeger | Feb. 12, 1929 |
| 2,082,053 | Freudenberg | June 1, 1937 |

FOREIGN PATENTS

| Number | Country | Date |
|---|---|---|
| 52,579 | Germany | July 2, 1890 |
| 297,352 | Germany | Apr. 13, 1917 |
| 326,823 | Germany | Oct. 2, 1920 |